Nov. 7, 1950 — E. JAFFE — 2,528,831
LUGGAGE HANDLE COMPRISING TWO COMPLEMENTARY
AND INTERLOCKED HOLLOW-SECTIONS
INDIVIDUALLY COVERED
Filed July 15, 1948 — 2 Sheets-Sheet 2
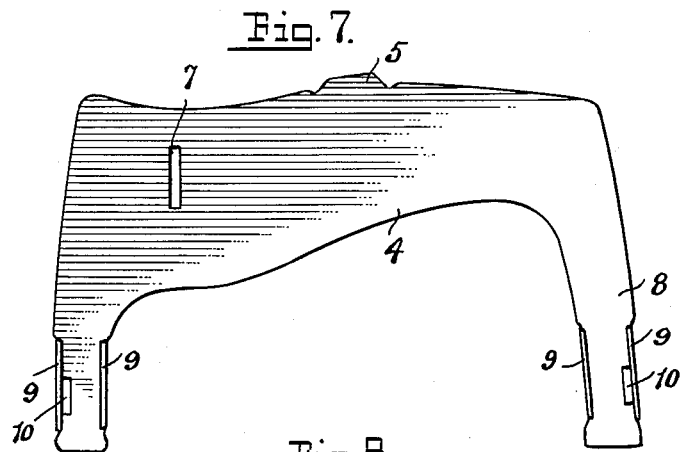
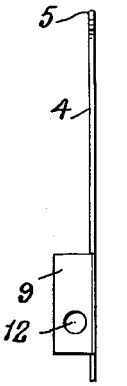
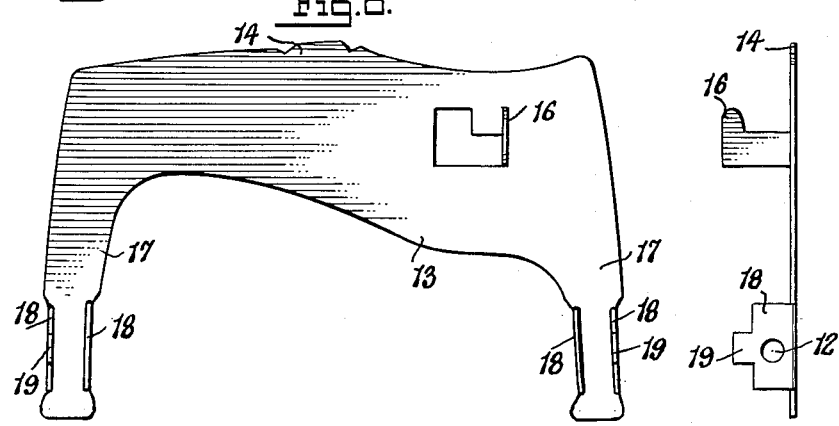
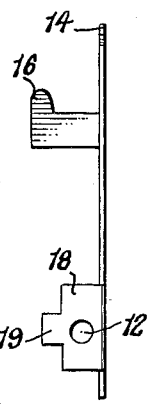
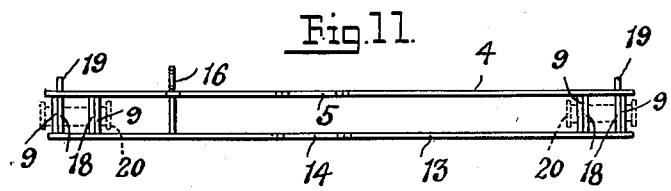
INVENTOR.
Elias Jaffe
BY Fritz Ziegler
Attorney Patented Nov. 7, 1950

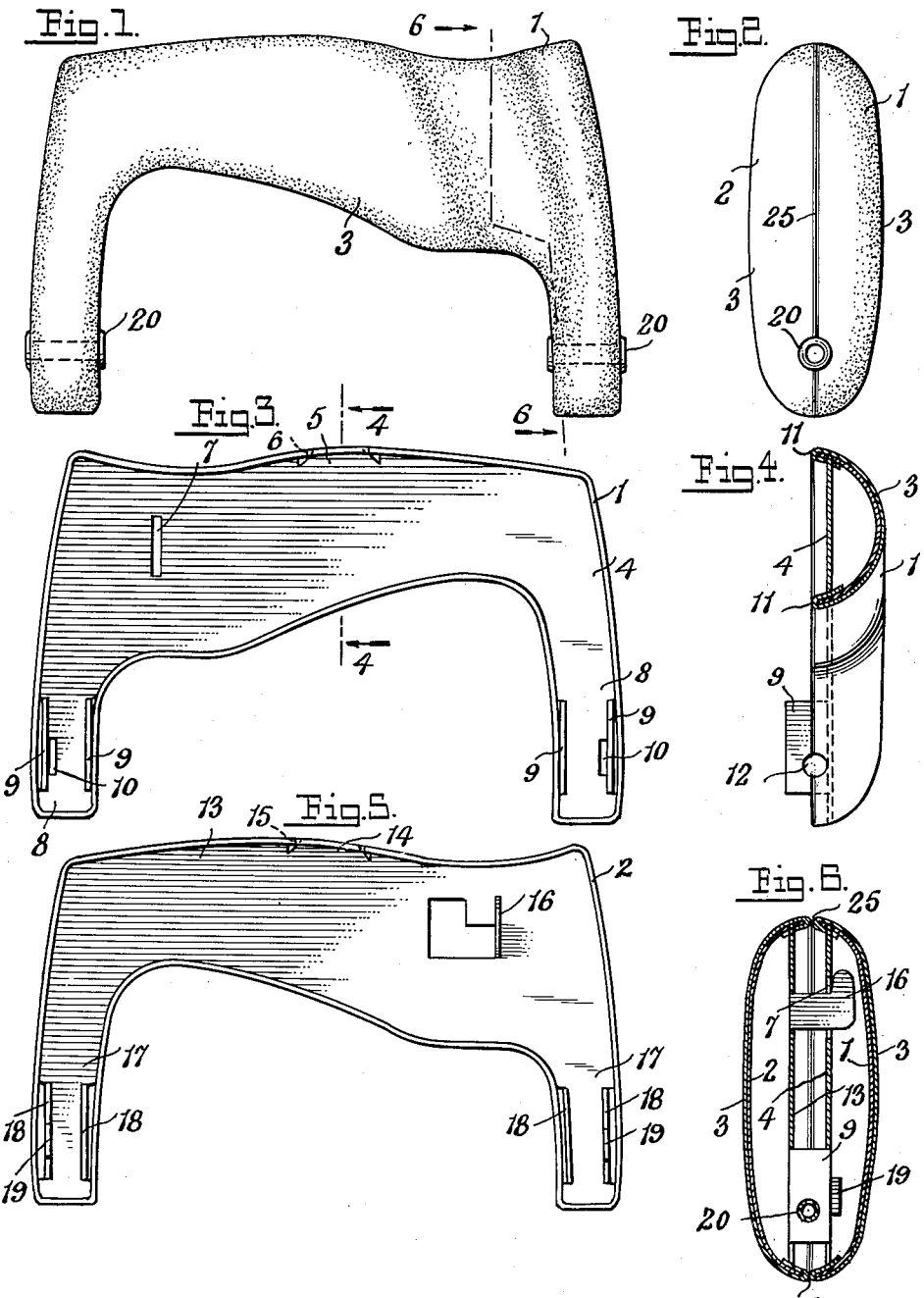

2,528,831

UNITED STATES PATENT OFFICE 2,528,831

LUGGAGE HANDLE COMPRISING TWO COMPLEMENTARY AND INTERLOCKED HOLLOW SECTIONS INDIVIDUALLY COVERED

Elias Jaffe, New York, N. Y.

Application July 15, 1948, Serial No. 38,781

6 Claims. (Cl. 190—57)

This invention relates to baggage handles, and more particularly to the type of handle employed upon suit cases, handbags and other articles. An object of the present invention is to provide a handle of this character of strong, sturdy construction; one which is easily assembled and can be covered with leather or other suitable sheet material, and which will be of attractive appearance and lend distinction to the handbag or other article of which it forms a part.

Another object of the invention is to provide, in a handle of this type, a novel means by which the sheet material covering can be evenly and smoothly applied over the handle, and to provide means by which two handle sections may be coupled or attached together to form a sturdy, smooth handle structure.

Still another object of the invention is an improved connection means for handle sections by which two halves of the handle, each of which is covered by a suitable sheet material covering, can be coupled or joined together to form a smooth, rounded handle having no protruding parts and with the coupling means so disposed with relation to the two handle sections that such means is substantially concealed and invisible.

More particularly, the invention contemplates the provision of a pair of hollow handle sections or halves, each of which contains a plate serving to hold covering material in position over the handle half, said plates having interengaging elements acting to lock together said plates and hence couple together the handle halves or sections within which the plates are fitted.

These and other objects are attained by the invention, a more particular description of which will hereafter appear and be set forth in the claims appended hereto.

In the accompanying drawing, wherein an illustrative embodiment of the invention is disclosed:

Fig. 1 is a front elevation of a baggage handle constructed in accordance with the invention;

Fig. 2 is an end view of the handle looking from the left of Fig. 1;

Fig. 3 is a view looking at the inside face of one of the halves of the handle;

Fig. 4 is a sectional view taken on the line 4—4 of Fig. 3, looking in the direction of the arrows;

Fig. 5 is a view looking at the inside face of the second handle half;

Fig. 6 is a sectional view taken on the line 6—6 of Fig. 1, looking in the direction of the arrows;

Fig. 7 is a face view of one of the retaining plates;

Fig. 8 is a face view of the second retaining plate;

Fig. 9 is an end view of the plate shown in Fig. 7;

Fig. 10 is an end view of the plate shown in Fig. 8, and

Fig. 11 shows the manner in which the two plates are interengaged when the two halves of the handle are fitted together.

The improved handle is primarily composed of two hollow handle shells or halves which are coupled together in a manner to be explained, to provide a smooth, rounded handle which can be easily grasped and comfortably held. In the form shown, particularly in Figs. 1 and 2, the handle is shaped to fit the hand, although for the purposes of the present invention the handle need not be made in this particular form but may be made in any of the various forms known in this art.

The first of the handle halves or shells is shown at 1, the same being concavo-convex in cross-sectional shape, and it may be pressed, stamped or otherwise formed from sheet metal, formed from plastic or produced in any other known manner. The half 1 is covered by suitable sheet material, such as leather, fabric or other suitable covering 3 which is drawn smoothly over the convex surface of the handle half and extended around the edge of the same as shown at 11 in Fig. 4.

Within the handle half 1 is a retaining plate 4, shaped to snugly fit within the handle half and lie inwardly from the edge of the shell 1. This plate 4 serves to engage against the inturned edge portion 11 of the covering 3 and thus the plate acts to hold the covering smoothly in place over the handle half. The plate 4 preferably fits tightly but removably within the shell or handle half 1 and it is additionally maintained therein by means of a lug 5 provided on its upper edge, as clearly shown in Fig. 7, which lug 5 enters into engagement with a slot 6 formed in the top wall of the shell or handle half 1. This slot 6 and the lug 5 entering the same are, of course, covered and concealed by the covering 3.

Provided in the retaining plate 4 is a slot 7 and said plate also has legs 8, each of which is formed with a pair of laterally-projecting tongues 9 which are spaced apart as shown and project out of the handle half or shell 1 as clearly shown in Fig. 4. Between each pair of the tongues 9 is formed a slot 10 and the tongues 9 are formed with aligned holes 12 to receive a hollow rivet 20 in a manner to be explained.

The second handle half is shown at 2 and the same is covered with sheet material 3 in the manner explained with respect to the handle half 1. The half or shell 2 is provided with a retaining plate 13 fitted within the concavity of the half 2 similarly to the way in which plate 4 is fitted within the first half 1. Plate 13 is provided with the lug 14 engaging in a slot 15 in the top of the handle half 2. A hook-shaped member 16 is stamped out of the body of the plate 13, said member 16 being adapted to enter through the slot 7 in plate 4 and engage behind the plate 4 in the manner clearly seen in Fig. 6.

Formed on the plate 13 are leg portions 17, each of which is provided with a pair of spaced laterally-extending tongues 18 adapted to fit between the tongues 9 on plate 4, when the handle is assembled. When the tongues 18 are so projected between the tongues 9, a lug portion 19 on one of the tongues 18 in each pair, will enter the slots 10 in plate 4.

From the foregoing, the manner in which the handle is assembled and the two halves thereof are coupled and held together, will be readily understood. After the plates 4 and 13 are inserted in the respective handle halves 1 and 2, the two halves of the handle are then ready to be coupled together. This is done by bringing the two halves 1 and 2 together with their concave sides in facial relation so that the two plates 4 and 13 face one another, at which time the hook 16 may be readily inserted through slot 7 and caused to engage behind the plate 4 as seen in Fig. 6. The tongues 18 are inserted between the tongues 9, and since tongues 18 are provided with the holes 12 similar to those formed in the tongues 9, the holes 12 in the several tongues will now be presented in alignment. When the tongues 18 are entered between the tongues 9, the lugs 19 will enter the slots 10. Tubular rivets 20 are next extended through the aligned holes 12 and through the handle halves and the same will now hold the parts in interengaged and interlocked relation and the two halves of the handle will be thus joined to form the complete handle shown in Figs. 1 and 2. The relationship of the two plates 4 and 13 when coupled together as above described, will be seen in Fig. 11. It will be observed that when the two halves of the handle are connected together as above described, a single, scarcely perceptible joint 25 is all that is exposed to indicate that the handle is composed of several parts and this seam or joint attracts rather than detracts from the appearance of the handle.

The tubular rivets 20 constitute passages for the conventional loops provided on the bag to which the handle is attached. By removal of the rivets, the handle halves may be readily separated and easily recovered with leather or other covering 3 by taking out the plates 4 and 13.

As previously explained, the handle may be made in various shapes to suit the needs of the individual pieces of luggage to which it is intended to be attached, and various other modifications may be made in structure without departing from the scope of the claims appended hereto, such as for instance providing additional slots and lugs and additional slots and hooks for securing the retaining plates in the handle halves.

What I claim is:

1. A handle of the character described comprising two handle halves, each of said halves being of concavo-convex form and having a plate fitted within its concave side, a flexible covering fitted over each handle half, the covering extending over the convex surface of the handle half and being inserted between the edge of the plate and the inner surface of the handle half, the two plates being provided with interlocking elements, the two handle halves being placed with their concave sides in confronting relation whereby said elements on the two plates will be placed in interlocking engagement to thereby hold the two halves of the handle together as a unit.

2. A handle of the character described comprising a pair of handle half-sections, a plate fitted within each of the half sections, the two handle half-sections being placed together with the plates facing one another, the plates being provided with parts arranged to interlock when the handle half-sections are placed together, and a sheet material covering disposed over the outer surface of each handle half-section, said sheet material being tucked inside of the handle half-sections and held between the edges of the plates and the inner surface of the half-sections.

3. A handle of the character described comprising a pair of handle halves, each of said halves being of concavo-convex form, one handle half having a plate inserted in its concave side, interlocking means between said plate and the handle half in which it is inserted to hold said plate within the handle half, said plate being formed with an aperture, a plate fitted within the concave side of the second handle half, interlocking means between said plate and the second handle half to hold the latter plate in said handle half, the last-mentioned plate being provided with a hooked tongue, the two handle halves being disposed with their concave sides in confronting relation, and the hooked tongue on the second plate engaging in the aperture in the first plate when the handles are so disposed, the two plates having overlapping parts provided with tubular rivets extending through them.

4. A handle as provided for in claim 3, wherein the overlapping parts of the plates consist of tongues bent laterally from the two plates, each handle half having a sheet material covering extending over its convex face, said covering being maintained in place on the handle halves by the plates.

5. In a handle construction of the character described, a pair of handle halves of hollow form, each of said halves being open at one side, a plate fitted in the open side of each half, each half having a slot, a tongue on each plate for reception in said slot, a slot provided in one of the plates, a hook member provided on the second plate for reception in said slot, the plates each having lateral tongues, the tongues on one plate being overlapped with respect to those on the other plate, and tubular fastening sleeves extending through the several overlapped tongues on the plates.

6. In a handle construction of the character described, a pair of handle halves of hollow form, each of said halves being open at one side, a plate removably fitted in the open side of each half, each half having a slot in its top, a tongue at the top of each plate for reception in said slot, a slot provided in one of the plates, a hook member provided on and extending laterally from the second plate for reception in said slot, the plates each having a plurality of lateral tongues, the tongues on one plate being overlapped with respect to those on the other plate, and tubular fastening sleeves extending through the several overlapped tongues on the plates.

ELIAS JAFFE.

REFERENCES CITED

The following references are of record in the file of this patent:

UNITED STATES PATENTS

| Number | Name | Date |
|---|---|---|
| 1,816,277 | Anthony | July 28, 1931 |
| 2,273,442 | Hedu | Feb. 17, 1942 |
| 2,398,436 | Mason | Apr. 16, 1946 |

FOREIGN PATENTS

| Number | Country | Date |
|---|---|---|
| 470,767 | Germany | Jan. 30, 1929 |